July 2, 1963 H. A. REITFORT 3,096,508

INPUT OUTPUT APPARATUS

Filed Dec. 31, 1959 5 Sheets-Sheet 1

INVENTOR
HENRY A. REITFORT

BY William N. Barret
ATTORNEY

INPUT OUTPUT APPARATUS

Filed Dec. 31, 1959 5 Sheets-Sheet 2

July 2, 1963 H. A. REITFORT 3,096,508

INPUT OUTPUT APPARATUS

Filed Dec. 31, 1959 5 Sheets-Sheet 3

July 2, 1963 H. A. REITFORT 3,096,508

INPUT OUTPUT APPARATUS

Filed Dec. 31, 1959 5 Sheets-Sheet 4

July 2, 1963 H. A. REITFORT 3,096,508

INPUT OUTPUT APPARATUS

Filed Dec. 31, 1959 5 Sheets-Sheet 5

United States Patent Office 3,096,508

Patented July 2, 1963

3,096,508
INPUT OUTPUT APPARATUS

Henry A. Reitfort, Vestal, N.Y., assignor to International Business Machines Corporation, New York, N.Y., a corporation of New York Filed Dec. 31, 1959, Ser. No. 863,335
2 Claims. (Cl. 340—172.5)

Figure 1A:
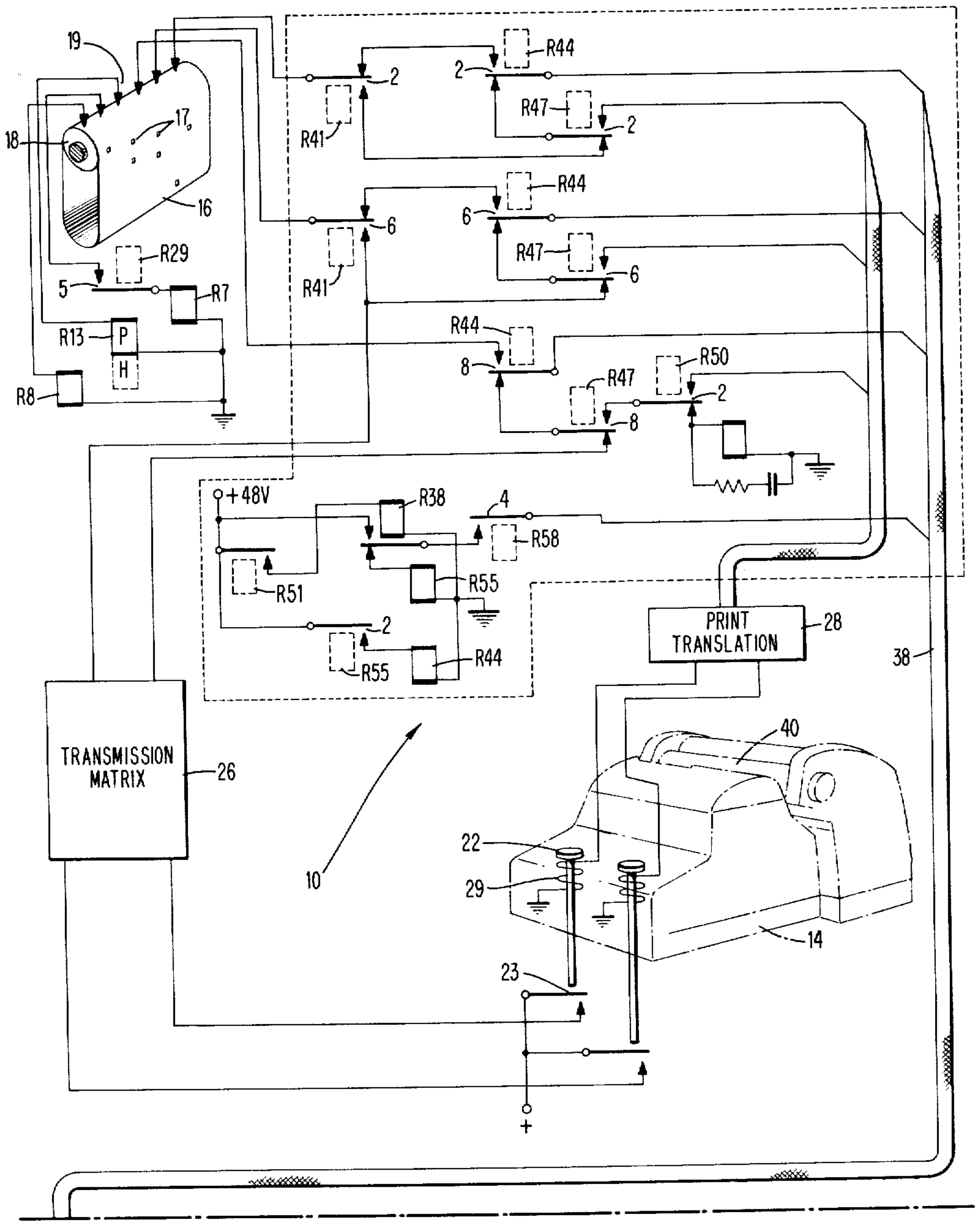

The present invention relates to a data transmission system for an input output to a data processing machine and in particular to multiplex data transmission system for an inquiry station used with a data processing machine.

An inquiry station with which this data transmission system is concerned is shown in application Serial No. 715,669 to H. A. Reitfort. As disclosed in that application, a plurality of inquiry stations are provided for effecting interrogation and receiving replies from a data processing machine to which these inquiries are addressed. In the applications for which these data processing machines and their peripheral equipment are designed, inaccuracies in the transmission of information are in all probability the one thing which completely destroys all usefulness a machine may have. In the system referred to in the above-mentioned application, the greatest care was taken to insure that all those things which could introduce error were adequately safeguarded. In this respect, all data transmission between inquiry station and console was accomplished by separate lines to insure proper signal paths and interrelation of transmitted and received data.

While the above-mentioned data processing machine provides all these desirable objectives, the necessary interconnecting circuitry between each individual inquiry station and machine console is undesirable both economically and by reason of the large number of wires necessary.

The present invention solves these problems by providing a multiplex of functions over a plurality of wires equal in number to the maximum which was required formerly for one function. The separation of each individual function into its proper area is accomplished by a series of transmission reception interlocks associated with each station to insure that all data is correctly collated.

It is therefore an object of this invention to provide an improved data transmission system for the input output of a data processing machine.

It is another object of this invention to provide a multiplex data transmission system for a data processing machine in which data is read in and out of a data processing machine by a common plurality of lines.

It is a further object of this invention to provide a multiplex data transmission system for the input output of a computer in which provision is made to insure that information will be properly routed to the various units.

The foregoing and other objects, features and advantages of the invention will be apparent from the following more particular description of a preferred embodiment of the invention, as illustrated in the accompanying drawings.

Figure 1B:
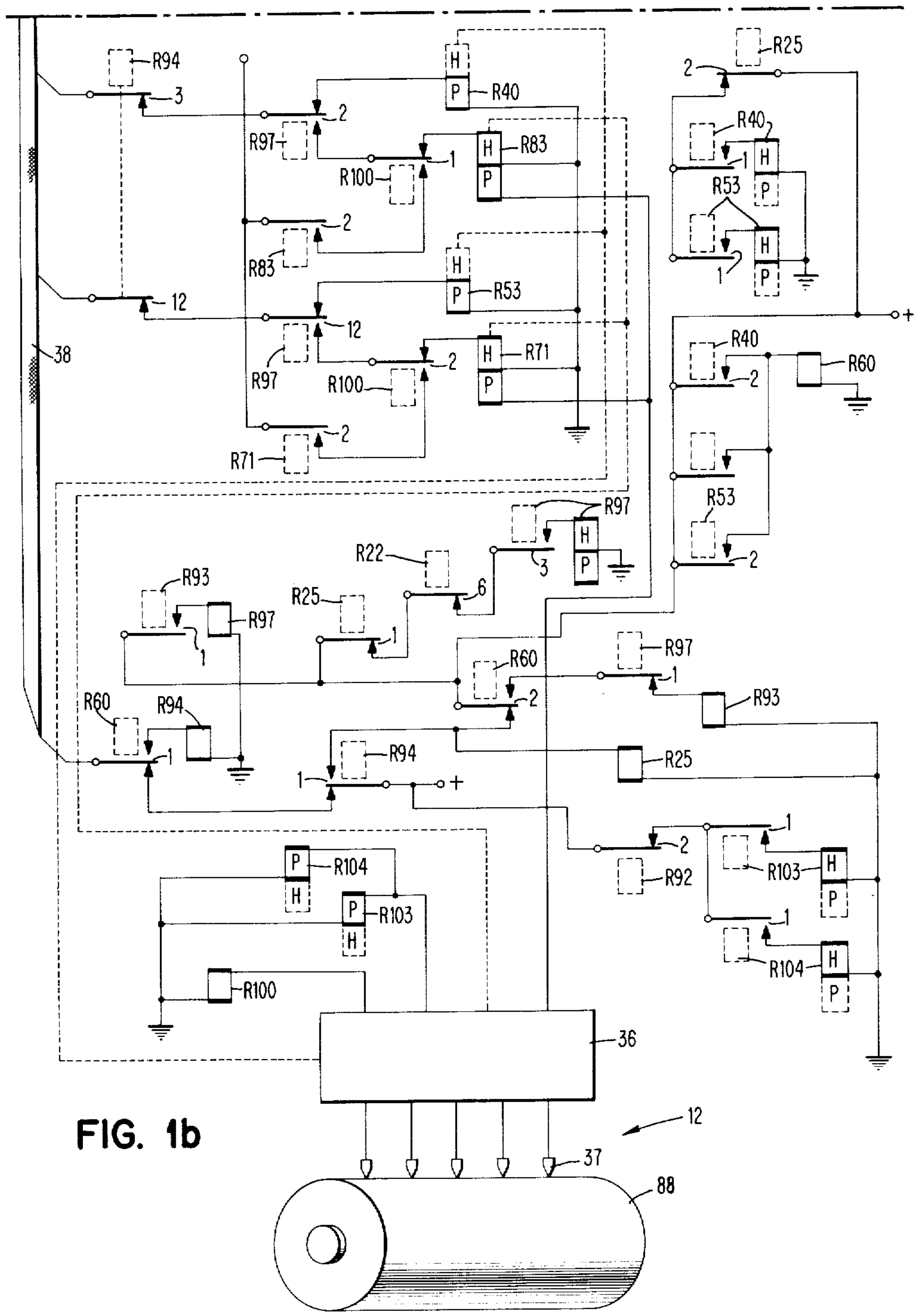

In the drawings:

FIGS. 1*a* and 1*b* are a schematic illustration of a portion of the invention.

Figure 2A:
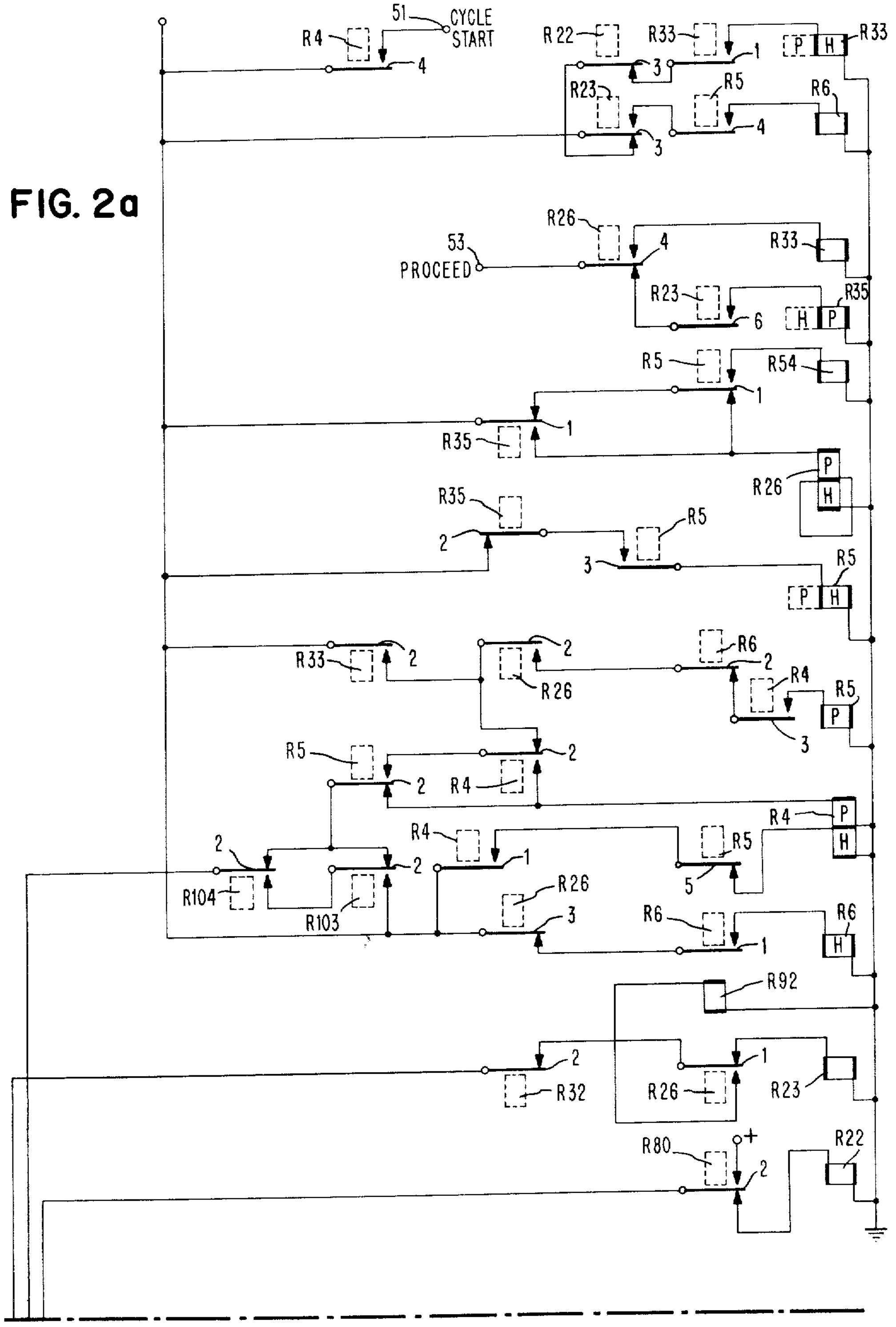
Figure 2B:
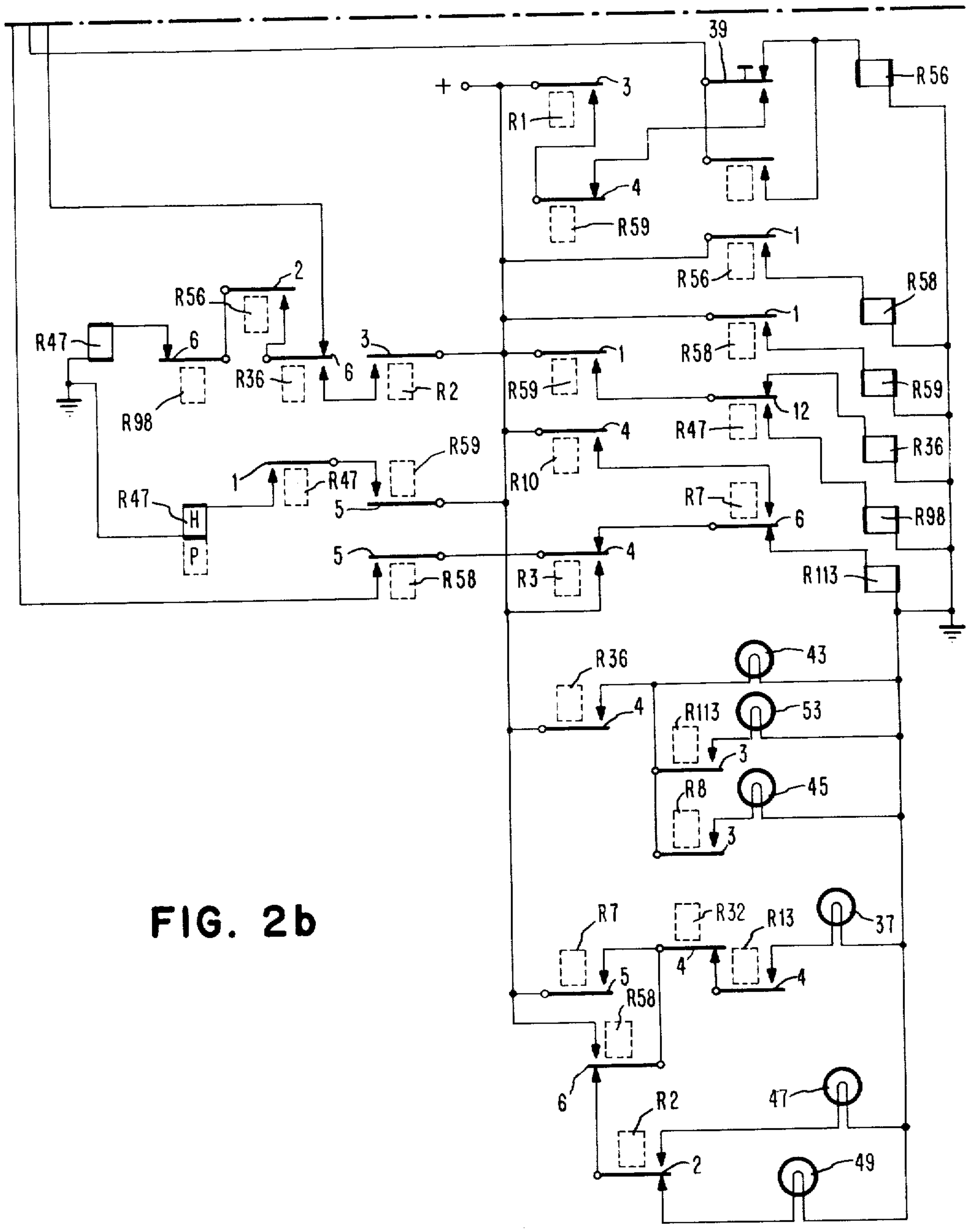

FIGS. 2*a* and 2*b* are a circuit diagram of a portion of of the invention.

Figure 3:
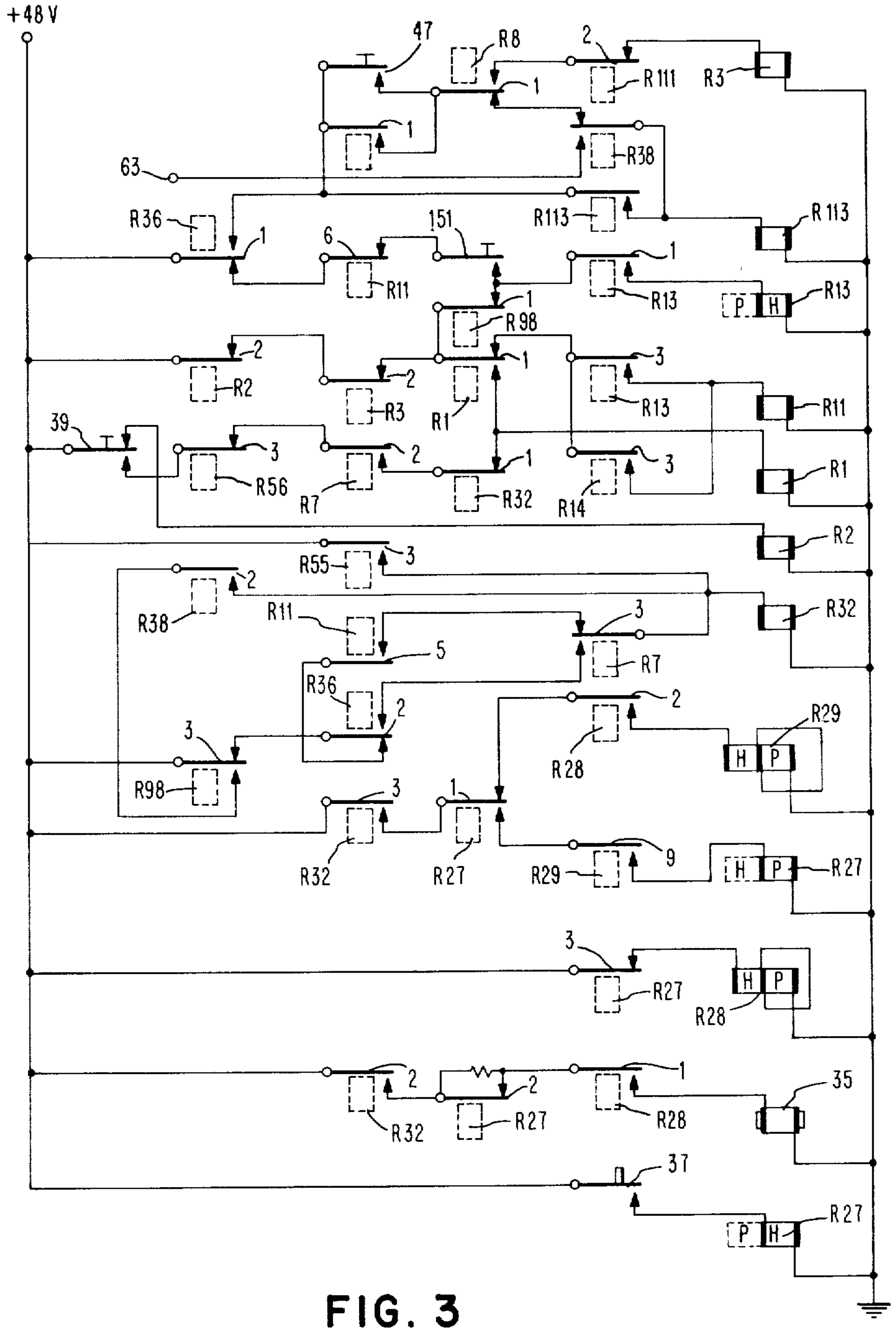

FIG. 3 is a circuit diagram of the format control shown in FIG. 1*a*.

The present invention has as an object the transmission and reception of information to and from both the inquiry station shown generally at 10, FIG. 1*a*, and a data processing machine shown generally at 12, FIG. 1*b*. The inquiry station includes a typewriter 14 having a plurality of keys 22 for each character which is to be utilized in the system. Each key 22 when operated closes a contact 23 to complete a circuit to a transmission translation matrix 26. This translation matrix takes the single energized line connected to the key 22 and translates it into a unique code designation for transmission over a line 38.

The typewriter 14 while operable to complete circuits through a translation matrix 26 is also operable by a print translation matrix 28 which operates in the reverse direction to take unique code characterizations from a line or cable 38 and by the matrix therein select a particular key by use of a magnet shown as a coil 29. The typewriter therefore acts as both an input device by the closure of contacts 22 and a printing device by virtue of the same operation wherein a coil 29 actuates the key 22 to cause the type bars, not shown, to strike against a platen 40 and make a legible impression of what has been transmitted.

Also forming a portion of the inquiry station is the format tape 16 which is carrying on a conducting contact roll 18. By a series of perforations 17 contained in the format sheet 16, brushes are enabled to make contact with the drum and complete circuits to apparatus to be described subsequently. The contact roll is operated one step for each transmission or reception of data from typewriter 14. This allows the operator when actuating the keys to have joined therewith a code designation of the location at which the information is to be recorded in the machine 12.

The data processing machine 12 is shown generally as containing a rotating magnetic drum 38. This drum contains a plurality of digit locations located about its periphery addressable from a drum input circuit 36. A position select circuit 32 is operated in response to data from the format control 16 for selecting the location on the drum to which information from the typewriter 14 is to be recorded or for selecting the particular digit location on drum 38 from which information to be printed by typewriter 14 is to be taken. Further, the character from and to the typewriter 14 is translated from and to a form suitable for recording on drum 38 and transmitting over cable 38.

The format tape 16 contains a number of columns of data sensed successively by brushes 19. The data is divided into at least two groups which are the input format and output format. These groups determine an input operation from typewriter 14 to data processing machine 12, the location at which each character from typewriter 14 will be stored. On an output operation, each successive column of format data will select the position on drum 38 from which data will be taken for transmission to the typewriter 14.

In order that the format tape 16 will be properly located with respect to input output operations, predetermined coded marks are placed in tape 16 to indicate the beginning of a predetermined input format or the beginning of an output format.

Before an inquiry request can be accepted by the data processing machine, it is necessary that the format tape 16 be moved to the beginning of the input format. As shown in FIG. 1*a*, sensing brushes 19 for columns 7 and 13 are connected to relays R13 and R7, respectively. The presence of holes in these columns will energize the relays R13 and R7 to indicate that the format tape is standing at the correct location. When a hole is sensed in row 7 of the format tape, the relay R13 will be picked. In FIG. 3, the contacts R13–1 will therefore be closed to the relay R13H which is the hold coil for the relay R13. When the key 151 is depressed to move the format tape to the correct position, plus potential will be furnished from the line through the contacts R36–1 and R11–6 to pick the relay R13 through hold coil R13H. When the relay R13H operates, the contact point R13–3 completes the circuit to the relay R11 which operates through the contact points R1–1, R3–2 and R2–2 to +48. R11 is called the advance tape relay.

A tape space relay R32 is connected from ground through the tansfer point R7–3 to the normally open point R11–5 and also through its open point to a normally open relay point R36–2 and through a normally closed point R98–3 to plus potential. If the tape is standing in the input format, the relay point R7–3 is transferred and the circuit will not be completed through the relay point R11–5 which would be closed when the relay R11 operates to energize the relay R32. With the presence of both the holes in row 7 and row 13 of the format tape 16, the relay R32 will not be picked and the tape will remain stationary.

If the hole in row 13 is not present and the hole in row 7 is, then the relay R7 will not be operated and the circuit will be completed with the contact point R11–5 which is closed when the format key 151 was operated to pick the relay R32. When the inquiry station was first turned on, potential was furnished through contact R27–3 to the hold and pick coils of a relay R28 to operate the same. With relay R28 operated, a circuit will be completed from potential through a contact point R32–3 now closed through the transfer point R27–1 through the contact point R28–2 to pick the relay R29. A hold coil R29H is short circuited to provide an increased delay in pickup and dropout. The relay R32 is operated and relay R28 is operated so that the contact point R32–2 will be closed and contact point R28–1 will be closed to the escape magnet 35 which will operate to drive the format tape 16 to advance it one column. As the tape advances, a mechanical contact 37 contained in the advance mechanism is closed to complete a circuit to operate the relay R27. Relay R27 which has the contact point R27–3 in the circuit of the relay R28 operates and drops the relay R28 out, which in turn opens the circuit to the tape advance mechanism and the relay R29.

This operation continues until holes and channels 7 and 13 are sensed. Relay R29 has a long dropout so that the sensing of the format tape takes place after the tape movement has stopped. Holes, when sensed, initiate a circuit through normally closed points R29–4 to pick the relay R7, FIG. 1*a*. When relay R7 operates, the contact point R7–3 will be transferred and the circuit to relay R32 will be open and no stepping of tape 16 will occur.

When relay R13 is not picked by holes in row 7 of the tape, the tape will be advanced. The circuit for the advance tape relay R11 will be completed through a contact point R14–3 which is closed by relay R14, not shown, in response to holes in other rows, i.e., row 8, which are present when holes in row 7 are not. Holes are always present in either row 7 or 8 so that the tape will be advanced until a hole is sensed in column 13 to operate relay R7.

With the format tape positioned at its proper location, a light 37, FIG. 1*b*, will be energized through now closed contacts R7–5 and R13–4 to indicate that the inquiry station is ready for operation. The light 37 is contained in the key 151, FIG. 3, to visually indicate to the operator this condition. At this point, the operator depresses a request key 39, FIG. 3.

Depression of the request key completes a circuit through point R56–3 to the point R72 normally open, but now closed by virtue of format tape 16 being positioned at the first position of the format tape, through the normally closed point R32–1 to the relay R1. In FIG. 2*b*, the request key 39, which is the same as the one previously mentioned, is closed, the contact point R1–3 will be closed to furnish plus potential through contact point R59–4 through the request key to the line which goes to the processing machine, FIG. 2*a*, and through the transfer point R104–2, through closed contact point R5–2 to the relay R4P which is then operated. The closing of relay R4 completes a circuit to the terminal titled, Cycle Start. The cycle start signal operates to erase the previously recorded information on the drum to which the information to be transmitted will be stored. When the drum has been erased, a signal is generated over the proceed line at the top of FIG. 2*a* through the relay contact R26–4 to operate a proceed relay R33. Relay R26 was operated when power was turned on through the contact point R35–1 and the contact point R5–1 to the relay R26.

The inquiry station by means of the request signal from key 39 has gained control of the data processing machine in preference to other inquiry stations, the drum 38 has been erased and a signal sent back to proceed with the transmittal of information. Relay R33 is the relay which designates this fact. Relay contact R33–2 when operated combines with the proceed interlock relay contact R26–2 and the request relay contact R4–3, also closed to pick the input switch relay R5. When R5 picks the proceed interlock relay R26 is dropped through the transfer of contact R5–1 which completes the circuit through R5H. As the relay contact R4–3 completes a circuit to R5 which operates and the relay is held through hold coil R5H. Relay R4 then drops out when contact R5–3 opens the circuit to the hold coil R4H.

When the relay R4 is dropped, a circuit is completed through contact R104–2, contact R5–2 now closed by means of hold coil R33H to plus potential. With plus potential furnished to the contact of R104–2, the output to the inquiry station will have a raised potential. At the inquiry station, FIG. 2*b*, the release of key 39 will permit potential to be supplied to relay R56 to operate the same. Relay R56 through its contact point R56–1 picks relays R58. Relay R58 then through its contact point 58–1 picks relay R59. When relay R59 operates the contact point R59–1 is closed to complete a circuit through contact point R47–12 to relay R36. Relay R36 which is the input relay then operates and through contact point R98–3, FIG. 3, completes a circuit from plus potential through closed contact R7–3, closed by virtue of the hole in column 13, to pick relay R32 to provide a one space operation of format tape 16 so that the next column of data can be read. As soon as the next column is reached and no holes are present in column 13, the relay R7 will drop out as explained previously and the format tape will be standing so that the location of the first piece of data is then being sensed by the brushes. A light 43, FIG. 2*b*, is energized by the closing of contact R36–4 to indicate that the operator may proceed to type the message.

When the relay R58 operated, a contact R58–4 closes, FIG. 1*a*, and completes a circuit to relay R55 from the data processing machine, FIG. 1*b*. The line from the data processing machine, FIG. 1*b*, is shown connected through a contact point R60–1 and point R94–1 to potential. Relay R55, FIG. 1*a*, then operates and completes a circuit to relay R44, through point R55–2 to operate relay R44.

Relay R44 is the relay which connects the output from brushes 19 sensing tape 16 to the cable 38. When this relay operates, contact points R44–2, R44–6 and R44–8 operate to complete this circuit. As mentioned previously, only a few selected lines have been shown although the number is much larger since a large number of code designations are needed to identify the particular location at which data is to be recorded.

The rows of data on tape 16 which have holes therein energize the various lines and the potential is furnished to FIG. 1*b* through contact points 94–3 and 94–12, which illustrate only two of the many lines from inquiry station 10. The energized lines energize selected relays such as relays R40 and R53 connected through contact points 97–2, 97–12. When these relays operate, hold coils R40H, R53H, etc. will be energized through R40–1, R53–1 etc. to hold these relays in their operated state.

The relays R40, R53 etc. are the format relays of which only two have been shown which determine the location of the data then to be transmitted to drum 38. Relays R40, R53 etc. close circuits in a relay tree arrangement in selection circuit 36, to condition the reading heads at the proper digit location so that data can be recorded at this position. This is shown generally in the above referred to application.

When the relays R40, R53 etc. operate a contact R40–2, R53–2 etc. close to complete a circuit to relay R–60 to energize the same. When relay R60 operates, the contact R60–1 is transferred to the upper contact and potential is removed from the line to inquiry station 10. The in turn drops out relay R55, FIG. 1*a*, in the inquiry station which thereby opens contact R55–2 to drop out relay R44. When relay R44 drops out the circuits from the format, tape 16 will be disabled through contacts R44–2, R44–6 and R44–8.

When relay R60 operates, FIG. 1*b*, a circuit is closed from potential through contact points R60–2 and R97–1 to relay R93 which operates. Relay contact point R93–1 completes a circuit to relay R97 which closes and is held by coil R79H through contact points R25–1, R22–6 and R97–3. The relay R97 transfer contacts R97–2, R97–12 etc. to connect relay R83, R71, etc. in a circuit to the inquiry station, FIG. 1*a*.

When the operator strikes a key 22, the transmission matrix 26, which is a translator, will selectively energize a selected plurality of lines in cable 38. In the schematic illustration of only a few lines in FIG. 1*a*, the output from matrix 26 is shown connected through contacts R47–6 and R44–6, and through contacts R47–8 and R44–8 through the line interlock contacts R94–3, R94–12 etc. to the particular relays R83, R71 etc. which are energized.

The relays R83, R71 etc. are the data relays and operate through contacts contained in select circuit 36 to record the data represented by the character key 22 which was actuated. The transfer of information from the data relays to the drum 38 takes place in an exceedingly short time since the drum speed is approximately 12,500 r.p.m.

As the key 22 is depressed, FIG. 1*a*, a mechanical contact 51 is closed after a short mechanical delay. This contact completes a circuit to relay R38 to operate the same and transfer its contact so that potential is furnished to the output line. In FIG. 1*b*, the potential energizes relay R94 which opens the line interlock points 94–3, 94–12 etc. so that no further data may be transmitted over the lines and erroneous overlap prohibited. At the same time through relay contact R94–1 the relay R25 is energized to drop out the format relays R40, R53 etc. through the opening of contact point R25–2. The circuit to relay R97 is also opened through contact R25–1 to drop out this relay.

Each time relay R55 is operated in the inquiry station, FIG. 1*a*, the contact R55–3, FIG. 3, closes to advance the format tape to the next column in the same manner as mentioned when the relay R32 was energized previously. The components are then in the state in which they were previously and the next column of format data may be transferred.

In the illustration of FIGURE 1*b*, the use of the various format relays is shown to be used in the selection circuit 36 by the dotted lines from relays R40, R53 etc. In a like manner the data from typewriter 14 is conveyed by contact points of R83, R71 and this is shown by a dotted line from the hold coils of relays R83 and R71. Solid lines are used to the pick coils of relays R83, R71 from the selection circuit 36 since the relays are actuated by the energized circuit 36 in this manner, which will be explained subsequently.

When the format tape has advanced to the end of the input format on tape 16, the tape will then be sensing the next tape column which is the output format after the termination of this format due to the advance of tape after each data transmission.

The first column of data in the output format will contain holes in row 14 for each column. The row 14 hole is sensed by a relay R8, FIG. 1*a*. When relay R8 operates, the release key light 65 is energized to indicate to the operator that the message has been completely transmitted and the message should be verified. If the message transmitted is correct, a release key 47, FIG. 3, is depressed to complete a circuit to relay R3 through contacts R36–1 now operated, key 47, contact R8–1, and contact R111–2.

When relay R3 operates, the circuit for hold coil R13 is opened through contact R3–2 to allow the relay R13 to drop and extinguish the format light 37, FIG. 2*b*, by opening the circuit by contact R13–4. Through the contact R3–4, FIG. 2*b*, plus potential is furnished to the release relay R23 in the data processing machine, FIG. 2*a*. When relay R23 operates, a contact R23–3 transfers to drop out relay R33 by de-energizing the hold coil R33H.

At this point the inquiry station is standing in its output format and the machine is waiting to process the information. When the information is accepted into the machine proper, the input 53 has a raised voltage to operate relay R35 which drops out relay R5. The relay contact R35–1, FIG. 2*a*, completes a circuit to relay R26 to operate the same and drop out relay R23 by opening contact R26–1. When relay R5 drops out, contact R5–2 opens the circuit to operate relay R56 which drops out and in turn drops out input relay R36 which in turn drops out relay R3, FIG. 3, through opening contact point R36–1.

When the information has been processed and moved to the readout portion of drum 38, the information is analyzed to ascertain the particular inquiry station to which it should be directed. Since only one has been shown, only the necessary relays R103, R104 are shown connected from the output 36 of drum 38. When these relays operate, the contacts R104–2 and R103–2, FIG. 2*a*, transfer and potential is transferred to the inquiry station, FIG. 2*b*, to pick relay R56. Relay R56 closes its contact 56–2 to complete a circuit through contact R36–6 to the relay contact R80–2, FIG. 2*a*, now transferred to potential. Relay R80, not shown, is a checking relay operated at this time. The reply relay R47 is operated and held up through R47–1 and R59–5.

When relay R59 and relay R47 operated a circuit is completed to output format relay R98 through contacts R59–1 and R47–12. In FIG. 1*a*, the relay contacts R47–2, R47–6, R47–8, etc. are transferred to allow information from the data processing machine to be conveyed to print translation circuit 28 from line 38. The operation in the output format is essentially the same as for input format except that the tape space relay R32, FIG. 3, is actuated through contact R38–2 in response to the depression of a key by energization of a coil 29.

In this case also, the format tape determines the selection of a position on drum 38 from which to extract data by operation of format relays R40, R53 etc. However the information from drum 38 is utilized to operate relays R83, R71 etc. through the pick coils as shown. When the processing machine is transmitting information, a relay R100 is operated so that operation of relays R83, R71, etc. will close points R83–2, R71–2 to potential and transmit the same to inquiry station, FIG. 1*a*, to energize the relay tree translator 28 to actuate the key for that particular permutation of energized lines.

The process continues until the end of the output format at which time the inquiry station is released.

It should be understood that the rotating drum 38 represents only one type of storage device and that a core storage or any other suitable form may be used.

While the invention has been particularly shown and described with reference to a preferred embodiment thereof, it will be understood by those skilled in the art that various changes in form and details may be made therein without departing from the spirit and scope of the invention.

What is claimed is:

1. An inquiry station for a data processing machine wherein said inquiry station includes a record medium having a plurality of columns of format data, means for reading each column of said format data, means for advancing said record medium to read the next successive column of data wherein individual successive columns of data are presented to said reading means, a selectively operable keyboard character data transmitter means for transferring said format data and said character data to said processing machine, switching means in said inquiry station for alternately connecting said format and data transmitters to said transfer means in response to the transmission of a column of format data or character data, format storage means in said processing machine, format delay means in said processing machine responsive to the reception of said format data for operating said switching means in said inquiry station to connect said character data transmitter to said transfer means, and means responsive to the selection of character data in said inquiry station for interrupting said transfer means.

2. The apparatus of claim 1 further including character data storage means in said processing machine, and switching means operable in response to the reception of said format data for connecting said character data storage means to said transfer means.

References Cited in the file of this patent

UNITED STATES PATENTS 2,853,696 Mendelson ............ Sept. 23, 1958